Sept. 23, 1969     R. A. JENKINSON     3,469,136

LAMINATED STATORS FOR DYNAMO ELECTRIC MACHINE

Filed March 21, 1968

INVENTOR
R. A. Jenkinson
BY
ATTORNEYS

United States Patent Office 3,469,136
Patented Sept. 23, 1969

3,469,136
LAMINATED STATORS FOR DYNAMO
ELECTRIC MACHINES
Robert Arthur Jenkinson, Birmingham, England, assignor to Joseph Lucas (Industries) Limited, Birmingham, England
Filed Mar. 21, 1968, Ser. No. 714,831
Int. Cl. H02k 1/12
U.S. Cl. 310—216　　　　　　　　　　　　　　1 Claim

ABSTRACT OF THE DISCLOSURE

A laminated stator assembly for a dynamo electric machine consists of a plurality of annular laminates in facial contact in the usual way, the laminates having slots for receiving windings. The slots in the laminates are not all the same shape, and as a result the laminates define a pair of axially extending edges which are discontinuous, this arrangement being found to reduce noise and improve cooling.

---

This invention relates to laminated stators for dynamo-electric machines, particularly for alternators.

A conventional laminated stator consists of a series of annular laminates in facial contact, each laminate having an outer periphery which is circular, and an inner periphery which is also circular but which is interrupted by slots defined by the laminates. Each slot defines with the inner periphery of its laminate two parallel axially extending edges the lengths of which are equal to the thickness of the laminate, and when the laminates are in facial contact, these edges are aligned to form continuous lines extending in a generally axial direction.

It is well known that alternators have a tendency to be somewhat noisy, and we have found that one of the reasons for this is the existence of the axially extending lines mentioned above. Thus, as the rotor passes a given slot, the flux first of all passes from the rotor to one of the lines defined by the aligned slots, then later the flux flows to both of the lines, and finally the flux transfers completely to the second line. This final transfer takes place very rapidly, and causes noise, and the object of the invention is to minimise this disadvantage.

The invention resides in a laminated stator assembly for a dynamo-electric machine, comprising a plurality of annular laminates in facial contact, each laminate having an outer circular periphery and an inner circular periphery which is interrupted by a plurality of slots, each slot defining with the inner circular periphery of its laminate a pair of axially extending edges, and the shapes of the slots in the plurality of laminates being such that when the laminates are in facial contact with the slots in the laminates aligned, said edges will form discontinuous lines extending in a generally axial direction.

Figure 1:
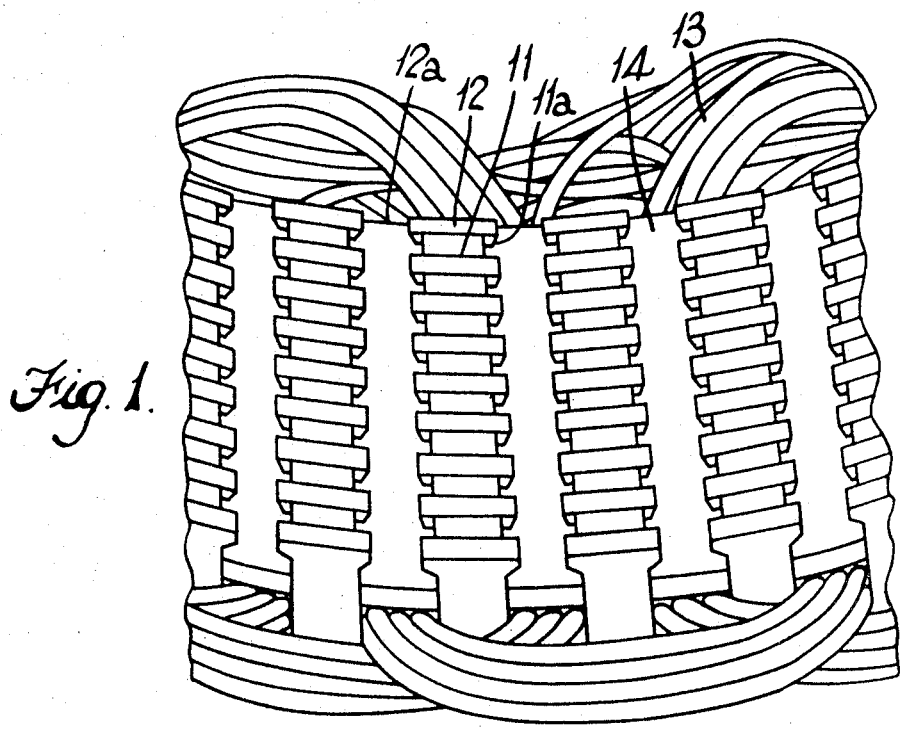
Figure 2:
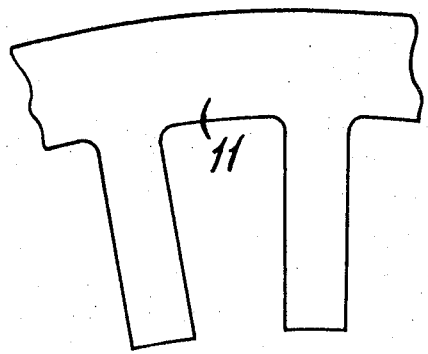
Figure 3:
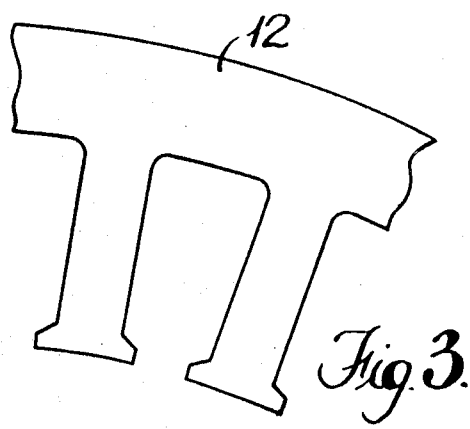

In the accompanying drawings,

FIGURE 1 is a view of the inside of a stator according to one example of the invention, and FIGURES 2 and 3 show the two shapes of laminate used in the stator.

Referring to the drawing, the stator consists of a series of annular laminates 11, 12 in facial contact. The laminates each have a circular outer periphery, and an inner circular periphery which is interrupted by slots which receive the windings 13 in the usual way, the winding being held in place by wedges 14. As shown in FIGURES 2 and 3, the laminates 11 have straight sided slots but the laminates 12 have inwardly extending portions at the entrances to their slots. The slots in both laminates define with the inner periphery of the laminate two parallel axially extending edges 11a and 12a the lengths of which are equal to the thickness of the laminate. In the assembled stator, the laminates alternate, and so the edges 11a and 12a form discontinuous lines extending parallel to the axis of the stator, so reducing noise as previously explained.

The laminates need not alternate. For example two laminates 12 could be followed by a single laminate 11, and then two further laminates 12 and so on, and other combinations using two or more than two types of laminate could be employed.

It has been found that the arrangement described not only reduces noise, but improves the cooling of the machine. The advantages which accrue from the invention are particularly useful in permanent magnet machines.

Having thus described my invention what I claim as new and desire to secure by Letters Patent is:

1. A laminated stator assembly for a dynamo-electric machine, comprising a plurality of annular laminates in facial contact, each laminate having an outer circular periphery and an inner circular periphery which is interrupted by a plurality of slots, each slot defining with the inner circular periphery of its laminate a pair of axially extending edges, and the shapes of the slots in the plurality of laminates being such that when the laminates are in facial contact with the slots in the laminates aligned, said edges will form discontinuous lines extending in a generally axial direction.

References Cited

UNITED STATES PATENTS

| 3,171,049 | 2/1965 | Jarret et al. | 310—193 XR |
| 3,013,168 | 12/1961 | Ellis | 310—254 XR |
| 2,694,781 | 11/1954 | Hinz | 310—254 XR |
| 2,461,296 | 2/1949 | Ordas | 310—259 |
| 911,713 | 2/1909 | Frankenfield | 310—214 XR |
| 2,235,903 | 3/1941 | Schoufelder | 310—51 XR |

MILTON O. HIRSHFELD, Primary Examiner

B. A. REYNOLDS, Assistant Examiner

U.S. Cl. X.R.

310—51, 65; 254